July 21, 1931.  A. I. MARCUM  1,815,416
ROAD VEHICLE
Filed Sept. 4, 1925  7 Sheets-Sheet 1

July 21, 1931.  A. I. MARCUM  1,815,416
ROAD VEHICLE
Filed Sept. 4, 1925  7 Sheets-Sheet 3

Fig. 5

July 21, 1931.  A. I. MARCUM  1,815,416
ROAD VEHICLE
Filed Sept. 4, 1925  7 Sheets-Sheet 4

July 21, 1931.  A. I. MARCUM  1,815,416
ROAD VEHICLE
Filed Sept. 4, 1925  7 Sheets-Sheet 6

Fig. 8

Inventor
Arthur I. Marcum
By William A. Strauch
Attorney

July 21, 1931.   A. I. MARCUM   1,815,416
ROAD VEHICLE
Filed Sept. 4, 1925   7 Sheets-Sheet 7

Inventor
Arthur I. Marcum
By William A. Strauch
Attorney

Patented July 21, 1931

1,815,416

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

ROAD VEHICLE

Application filed September 4, 1925. Serial No. 54,560.

The present invention relates to improvements in road vehicles.

More particularly the invention relates to improvements in road vehicles with more than two supporting axles or so-called multiple wheel road vehicles. Prior road vehicle constructions with more than two axles have been to a large extent commercially unsatisfactory primarily because of the difficulty in providing suitable spring suspensions which will permit the vehicle to travel over road irregularities without causing undue movements of the frame with relation to the road, and because of the proposed unsatisfactory steering and driving mechanisms and arrangements for the tandem axles and wheels, which limit the flexibility of the axle movements. The most satisfactory of prior proposed constructions have used independent truck arrangements interconnecting the tandem axles, and the frames have been supported from the trucks at single trunnion axes. In most prior truck constructions undesirable fore and aft frame movements are introduced as the wheels pass over road irregularities, and torsional strains and shocks are introduced in the axles due to the manner of their connection to the springs and to improper torquing and driving connections. In recent developments of this type the trunnion axes have been placed substantially in the plane of the wheel axes in order to eliminate the undesirable fore and aft movements of the frame, and provision has been made for resisting torque reactions interfering with the flexibility of the axle movement. Such arrangements permit the distance to vary between axles due to spring deflections without causing changes due to oscillation so that the torque resisting and drive connections must be expansible and contractible to provide for changes in the axle spacing due to spring deflections and the resilience of the spring suspension is deadened or reduced.

The steering and braking arrangements heretofore proposed for tandem axle constructions have provided no compensation for the relatively great oscillating movements of the axles and wheels with relation to the frame with the result that heavy stresses are set up in the braking and steering linkages under road conditions which materially limit the life thereof and introduce substantial distortion in the braking and steering actions. The truck type of suspension is particularly unsatisfactory for interconnecting tandem drive axles because of the fact that the propeller shaft or shafts from the front of the vehicle oscillates in arcs which are opposite in curvature to the arc of travel of the forward drive axle under road conditions. The result is that a rapid reversal movement of the spline connections in the propeller shaft occurs due to the inertia of parts and the driving stresses, axle bearings and the various joints and connections are rapidly destroyed and the life of the drive arrangement is considerably shortened. A further disadvantage of the prior truck constructions is that the frame load is taken on a single point of suspension at each side of each truck.

An object of the present invention is to provide improved flexible multiple wheel or tandem axle road vehicles in which the independent truck arrangement for tandem axles is eliminated, and the vehicle construction is correspondingly simplified; in which fore and aft movements of the frame is substantially eliminated, as the vehicle passes over road irregularities; in which the minimum distance between the axles is equal to the initial spacing thereof and in which changes in the distance between the axles due to spring deflections is eliminated, whereby deadening of the resilience of the spring suspensions is avoided.

Another object of the invention is to provide an improved multiple wheel road vehicle in which the frame is supported by means of tandem axles adjacent each end thereof which are connected to the frame in such manner that substantially no frame movement occurs as the wheels pass over ordinary road irregularities.

A further object of the invention is to provide a road vehicle embodying tandem steering and drive axles connected to the frame in such manner that the frame movement is substantially less than the wheel movement minus the spring deflection, and in which compensation for the relatively great movement of the wheel and frame carried steering and brake control members is compensated and the distorting effect of this movement is substantially eliminated.

Another object of the invention is to provide novel eight wheel road vehicles in which six or eight wheel brakes are provided.

Still another object of the invention is to provide a tandem axle steering arrangement for multiple-wheel road vehicles in which brakes are provided on the steering wheels and in which compensation for the braking reactions on the steering linkages for the movement of the wheels in relation to the frame is provided.

Still another object of the invention is to provide a road vehicle with a drive axle connected to the vehicle frame in such a manner that the axle movement with relation to the frame is substantially greater than the spring deflection, and in which the spline travel in a propeller shaft from an engine mounted on the frame to the drive axle is substantially eliminated.

A further object of the invention is to provide a multiple wheel road vehicle with tandem drive axles having a relative translatory motion in substantially all directions with relation to each other and movable with relation to the vehicle frame in compound rotary motion and comprising an intermediate drive connection and torquing arrangement disposed within the vertical limits of the axle housings.

Another object of the invention is to provide a multiple wheel road vehicle in which a pair of tandem drive axles are connected to the frame in a manner to permit a substantially greater movement thereof with relation to the frame than that due to the total spring deflection, and in which the spline ravel of the propeller and intermediate shafts or of dual propeller shafts is reduced to a minimum.

Still further objects of the invention are such as may be attained by a utilization of the various combinations, sub-combinations, and principles hereinafter more fully disclosed and as defined by the terms of the appended claims.

Figure 1:
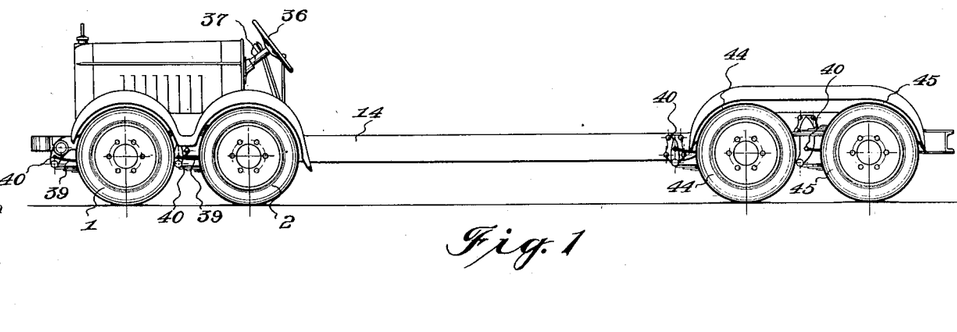
Figure 1 is a side elevation showing a preferred embodiment of the invention.
Figure 2:
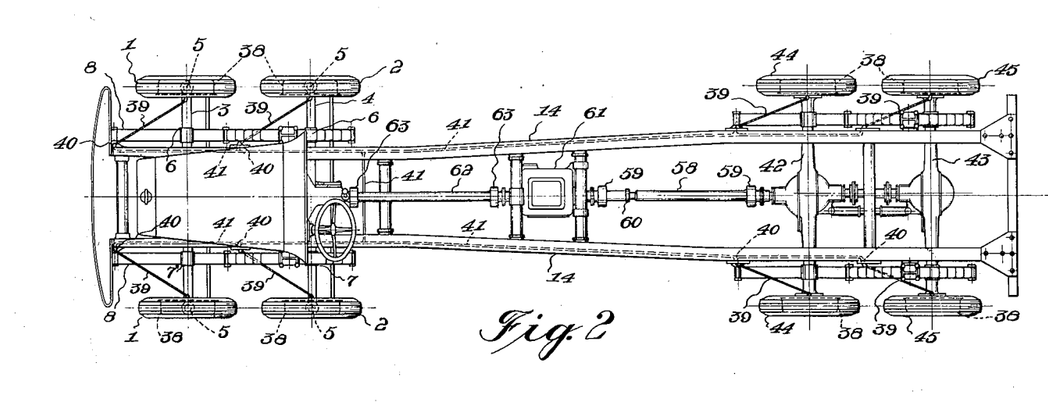
Figure 2 is a plan view of the form shown in Figure 1.

Referring to the drawings:

Pairs of steering wheels 1 and 2 are secured to the axles 3 and 4 by means of vertical kingpins 5 the centers of which are on the wheel centers as shown in Figure 2. The detailed constructions of the steering wheels and the kingpin arrangements are preferably as shown in copending application Serial No. 54,559, filed Sept. 4, 1925 but any other suitable form of kingpin support may be utilized. Journaled on the axles 3 and 4 adjacent the right or upper wheels 1 and 2 in Figure 2 are the spring supporting saddles 6, and adjacent the lower or left wheels 1 and 2, spring saddles 7 are rigidly secured to the axle 3 and have secured thereto and support leaf springs 8, while the saddles 6 and 7 of the axle 4 have secured thereto and support the leaf springs 9. The springs 8 and 9 are preferably supported from the saddles 6 and 7 to the rear of their centers and are pivoted at their forward ends by means of pins or bolts 10 and 11 or in any other suitable manner to the brackets 12 and 13. The brackets 12 and 13 are secured to and support the vehicle frame 14. The rear ends of the springs 8 and 9 are pivotally secured by means of the links 15 to the ends of equalizing springs 16 which in turn have secured midway between their ends the saddles 17. Saddles 17 are journalled on spindles or trunnions 18, and trunnions 18 are suitably supported in brackets 19 which in turn are secured to the frame 14.

Figure 5:
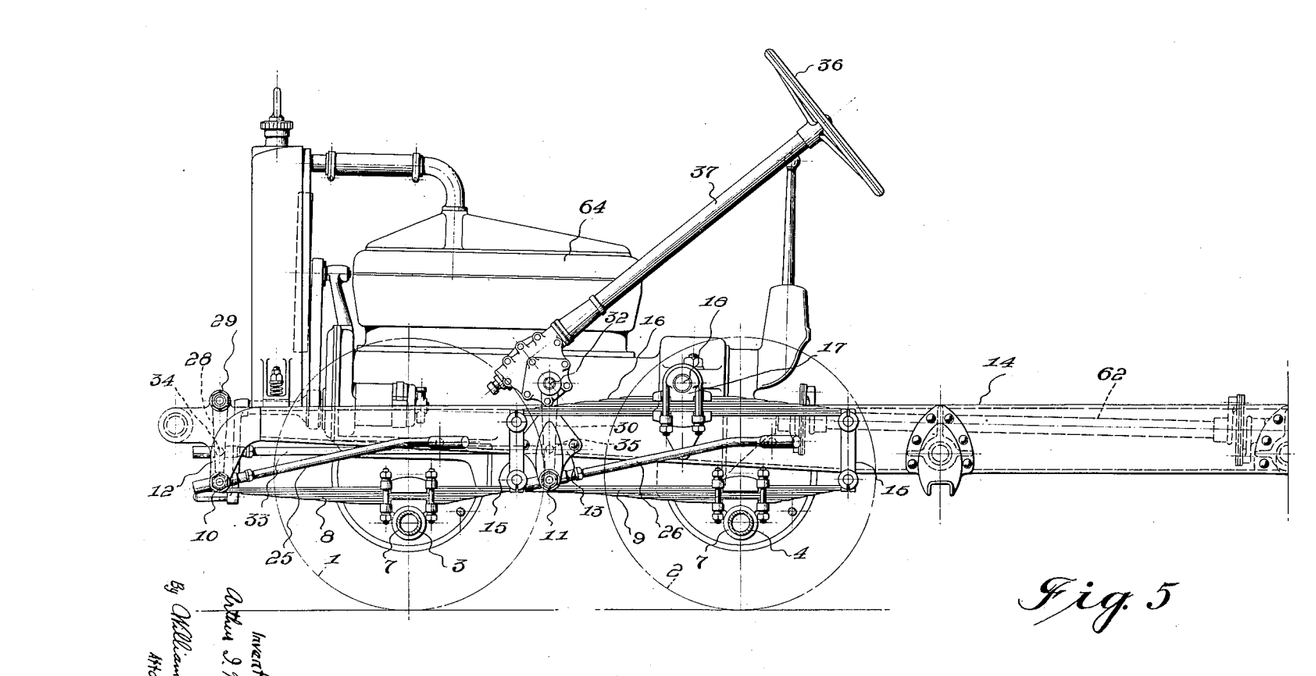
Figure 5 is a side elevation of the forward end of a preferred embodiment of the invention showing the spring suspension and steering arrangement.
Figure 6:
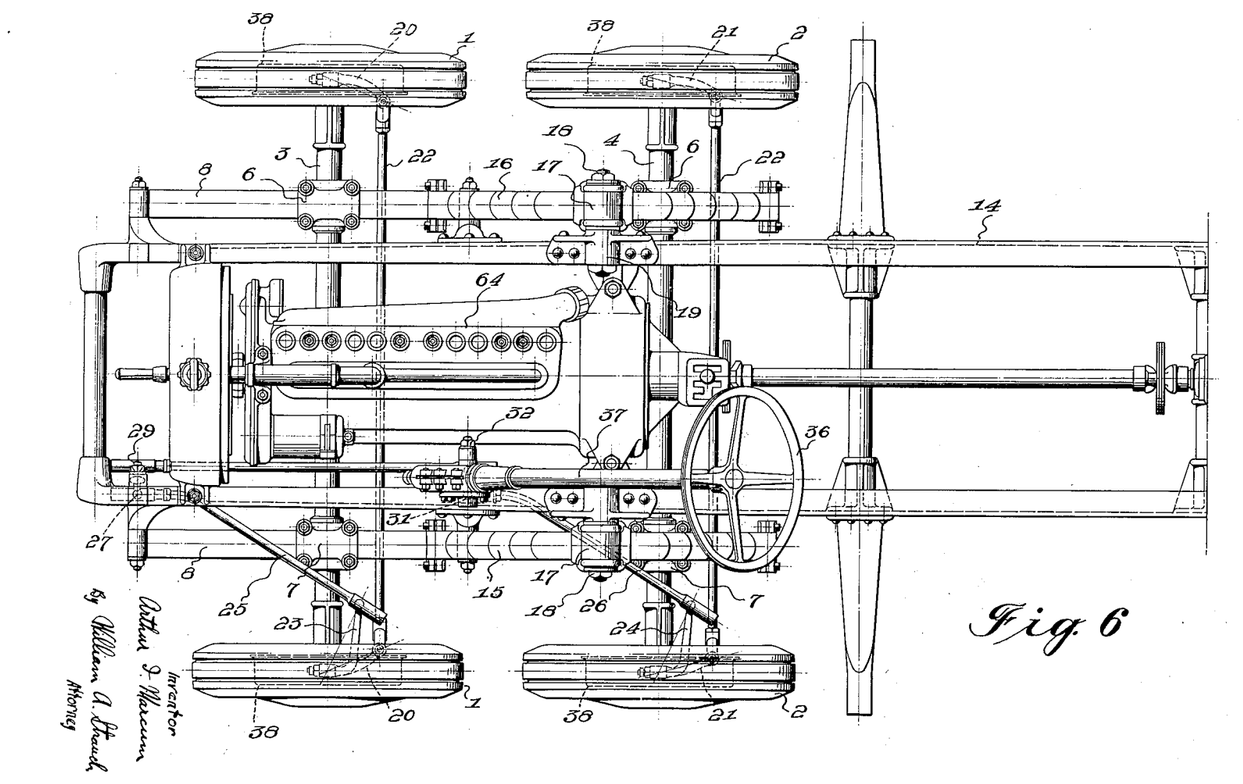
Figure 6 is a plan view of the details shown in Fig. 5.

The wheels 1 and 2 are provided with steering extensions 20 and 21 preferably in the manner shown in the copending application and those extensions are connected by means of the drag links 22 in suitable manner. The left wheels 1 and 2 are provided with steering arms 23 and 24 which are connected by means of suitable ball and socket joints or in any other well known manner to the rear ends of steering links 25 and 26. Steering link 25 is connected at its front end by means of a ball and socket connection 27 to (Figures 4 and 6) a steering arm 28 which is secured to a spindle 29 supported in a suitable bearing from the frame 14. As shown in Figure 5, the connection 27 between the end of the link 25 and the arm 28 is preferably in substantial axial alignment with the centers of the shackle-pins 10 securing the springs 8 to the frame when the wheels 1 and 2 are in alignment. The forward end of the link 26 is connected to the end of steering arm 30 by the ball and socket connection 31 (Figs. 4 and 6) which is substantially aligned with the axes of the shackle pins 11 when the wheels are in alignment. Arm 30 is secured to and rotatable with a spindle 32 journaled on the frame 14 in suitable manner, and arms 28 and 30 are interconnected by a link 33 which is connected at its ends thereto by ball and socket joints 34 and 35 in such manner that the arm 28 will move in unison with the arm 30. Spindle 32 is actuated from a steering wheel 36 through a steering column 37 and worm or other gear connections diagrammatically indicated in Fig. 4 in well known manner.

Each of the wheels 1 and 2 are preferably provided with brake members indicated by 38 and fluid pressure brake operated mechanisms preferably as shown in the above mentioned copending application. Flexible connections 39 are provided for the wheel carried brake operating cylinders and are connected at points 40 to the fluid pressure conduits or pipes 41 which are supported on the frame. Points 40 are preferably in substantial alignment with the shackle pin centers or oscillating axes 10 and 11 of the springs 8 and 9, or are sufficiently close thereto to substantially compensate for the relatively great movement of the frame and wheel carried braking members under road conditions. While brakes 38 have been shown as applied to all four of the steering wheels 1 and 2, the brakes may be omitted on the front steering wheels 1. In this manner the front pair of steering wheels will be left free to grip the road while the rear pair of steering wheels will be braked. In this way the possibility of locking all of the steering wheels during braking is avoided while the advantage of front wheel braking is retained on the rear steering wheels. As will more fully hereinafter appear, brakes are applied to all of the rear driving wheels, so that when only the rear front steering wheels are braked, a novel eight wheel vehicle with six wheel brakes is provided.

The rear end of the frame 14 is supported by the pair of parallel drive axles 42 and 43 which are supported by the pairs of pneumatic tired wheels 44 and 45 respectively to which brakes 38 are applied as set forth in connection with the front wheels. The driving wheel brakes 38 are also supplied with operating fluid through flexible conduits 39 connected to the frame carried conduit 41 at points 40 substantially aligned with the front shackle pins of the rear springs.

Figure 7:
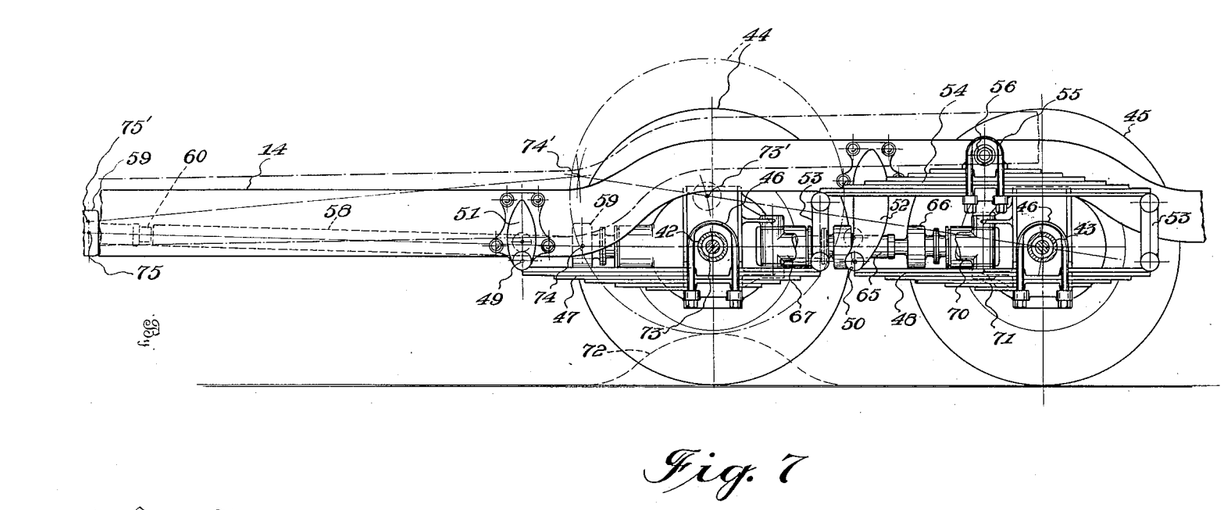
Figure 7 is a side elevation of the rear end of a preferred embodiment of the invention showing the rear spring suspension and details of the rear end.

Supported from the housings of each of the axles 42 and 43 by means of suitably journaled or universal ball and socket joints or connections are the spring supporting saddles 46. Secured to and supported from the saddles 46 at points intermediate their ends and preferably at the rear of the center thereof are pairs of springs 47 and 48 which are connected by means of pins 49 and 50 or other suitable connections to the supporting brackets 51 and 52. Brackets 51 and 52 in turn are secured to the rear end of the frame 14 at opposite sides thereof. The rear ends of the pairs of springs 47 and 48 on each side of the frame 14 are connected by means of the links 53 to the ends of the equalizing leaf springs 54 which have secured thereto and support saddles 55 at their mid portions. Saddles 55 support trunnion or bearing pins 56 which are secured to supporting members or brackets 57, in turn secured to the frame 14 at opposite sides thereof. Drive axle 42 is preferably a through drive axle of the type disclosed in copending application Serial Number 705,482 filed April 10, 1924, now Patent No. 1,670,119, dated May 15, 1928 in which a compensating differential drive mechanism is provided between a differential drive for the wheels 44 and a through drive shaft. The compensating differential in the axle 42 is driven from the forward end of the frame by means of the propeller shaft 58 which is provided with universal or flexible drive connections 59 and a splined or telescoping drive connection 60 (Figures 2 and 7). The front universal joint 59 of the propeller shaft 58 is driven from a midship transmission 61 suitably supported in the frame 14 which in turn is driven by means of a shaft 62 provided with universal joints or flexible drive connections 63 and is driven from an engine 64 of any suitable type. The engine 64 together with the transmission 61 and shafts 58 and 62 are preferably placed in the frame at a slight angle with the shafts 58 and 62 substantially aligned. The rear drive axle 43 is of any standard or well known type and is driven by means of an intermediate telescoping or splined shaft 65 provided with universal or flexible joints 66. Shaft 65 is driven from the through drive shaft of the axle 42, as more fully set forth in the copending applications. It will be noted that the axes of the intermediate shaft 65 and of the propeller shaft 58 are out of alignment as viewed in plan in Figure 2 and that the axis of the intermediate shaft is in the plane of the centers of the wheels 44 and 45 as viewed in side elevation in Figure 7, while the axis of the propeller shaft 58 is substantially in this plane. By utilizing this general drive arrangement an improved multiple wheel motor vehicle is provided embodying a substantially straight line drive in which angularity of the drive shafts is reduced to a minimum under road conditions; and a minimum body and road clearance is provided whereby a lowered floor line and improved construction over prior multiple wheel arrangements is provided.

Figure 8:
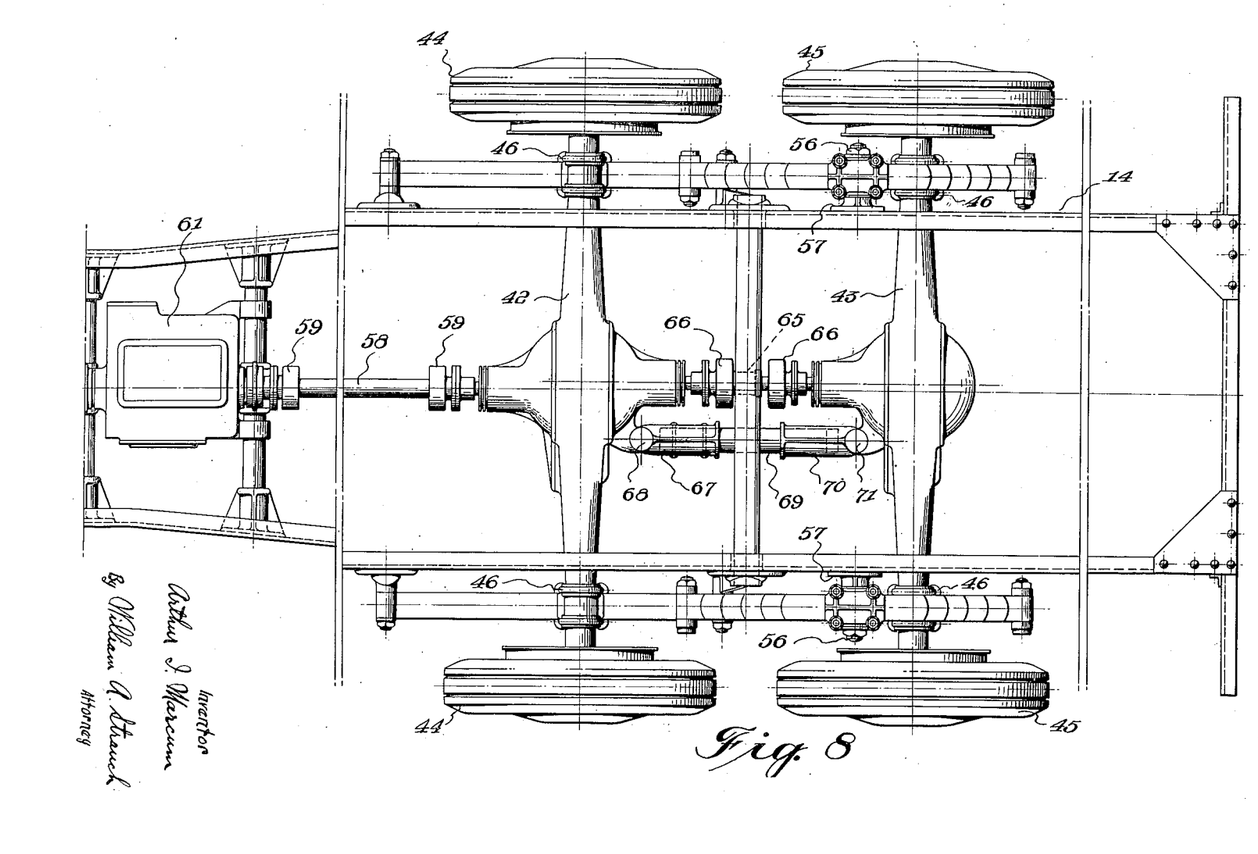
Figure 8 is a plan view of the rear end of a preferred embodiment of the invention showing the driving axle and torquing arrangements.

As either journaled or universal connections are provided between the axles 42 and 43 and the springs 47 and 48, provision must be made to prevent rotation of the axles about the supporting wheel centers and to compensate for the driving and braking reactions. This compensation is preferably effected independently of the frame and supporting springs in order to permit flexibility of motion of the axles with relation to the frame under road conditions. Accordingly a torquing socket member 67 is connected to suitable extensions of the axles 42 by means of a vertical pivot pin 68 (Fig. 8). A torque tube 69 is provided with one end thereof rigidly secured in the socket 67, and the other end thereof fits slidably and rotatably into a socket member 70 which is secured to extensions of the axles 43 by means of a vertical pivot pin 71. Under normal load conditions the free end of the tube 69 is free to slide in the socket 70 so that a limited relative movement in all directions of the axles 42 and 43 with relation to each other and at the same time a compound rotary motion of the axles with relation to the frame is permitted, but rotation of the axles about the centers of wheels 44 and 45 is prevented, and the intermediate shaft 65 and the axles are maintained in substantial alignment under road conditions.

In passing over an obstruction in the road such as is indicated, for example, in Figure 7 by the dotted raised portion 72, the wheels and frame will assume the position shown by the dot and dash lines. The center 73 of the wheel 44 will be shifted to the position indicated by 73', the center 74 of the universal joint 59 will be shifted to the point indicated by 74' and the center 75 of the front universal joint 59 of the propeller shaft 58 will be shifted to the position indicated by 75'. The center line of the intermediate drive shaft will under these conditions be compelled to assume the position indicated by the line drawn through the points 74' and 73' and the center of the wheel 45 due to the action of the torque tube. The center line of the propeller shaft 58 will be along a line drawn through the points 74' and 75'. It will be noted under these conditions that substantially no elongation of the propeller shaft 58 at the joint 60 occurs and that the elongation of the intermediate shaft 65 and change in angularity of the propeller shaft 58 with relation to the axle centers are relatively small.

Figures 3, 4:
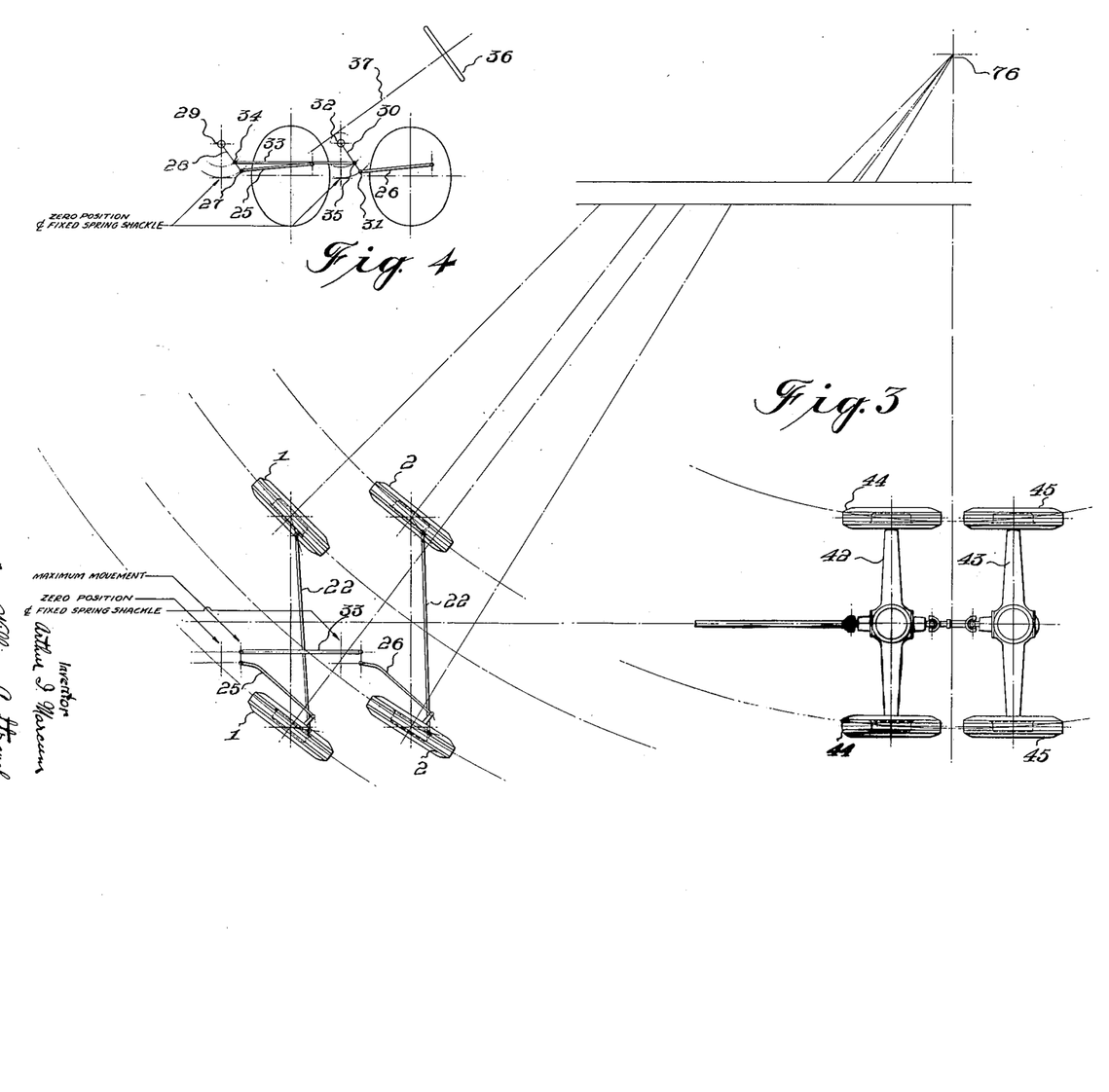
Figure 3 is a diagrammatic illustration of the steering arrangement and manner in which the front wheels track around a common center.
Figure 4 is a diagrammatic illustration showing the steering linkages interconnecting the front wheels.

The rear wheels 44 and 45 and the drive axles 42 and 43 are preferably non-steering, and the steering linkages for front pairs of wheels 1 and 2 are so proportioned and arranged that the steering wheels will track around a common center lying in a line parallel to the axes of rotation of the driving wheels 44 and 45 and substantially midway between the wheel axes as shown in Fig. 3. With this arrangement of steering linkages the tendency for the rear wheels to drag as the vehicle turns is reduced to such small limits, that the necessity for using rear steering arrangements is substantially eliminated. This tendency for the rear wheels to drag becomes so small with my improved steering arrangement that by utilizing pneumatic tires on the wheels 44 and 45 the deflection of the tire side walls as the vehicle turns compensates for and substantially eliminates the drag on the rear wheels, and the deflections of the tire side walls are substantially equalized.

It will be noted that the spring suspension in the form so far described interconnects the pairs of axles at each end of the frame without the use of independent interconnecting truck structures in such a manner that the load on the axles is equalized and a substantial relative translatory motion of the axles of each pair with relation to each other and a substantial compound rotary motion of each axle with relation to the frame under road conditions is permitted. Road shocks and axle movements must pass through the three springs on each side of the frame before they are transmitted to the frame. The deflection of the lower springs due to road shocks will accordingly be equalized so that the distance between the axles will not change due to spring deflections and the initial spacing is the minimum distance between the axles. No provision need therefore be made for contraction of the torquing and driving connections between the axles, and the torquing connections must make provision for the separation of the axles due to oscillation independently of spring deflections only. In this way the resilience of the spring suspensions is not deadened due to relative bodily movements of the axles as the springs deflect. Because of the difference in the lengths of springs and the positioning of the axles to the rear of the centers of the lower springs, the shocks are transmitted through a plurality of spring arms with different periods of vibrations. The linkages are such that the actual frame movement without spring deflection would be one half of the axle movement. Because of the suspension of the frame at a plurality of points from each spring linkage the frame load is distributed, and relatively light, flexible springs may be used. The amount of spring deflection may accordingly be made sufficient to prevent substantial road irregularities or obstructions, and the different periods of vibration of the various spring arms deaden the tendency of the frame to vibrate harmoniously due to road impacts. In this manner it will be seen that a road vehicle is provided in which substantially no movement of the frame occurs as the wheels pass over the usual road irregularities with the result that road impacts are substantially reduced and pneumatic tires may be utilized for relatively heavy vehicles.

Because of the nature of the spring suspension utilized in the present invention, the movement of the axles with relation to the frame as the vehicles pass over road irregularities is substantially greater than the movement which occurs due to spring deflection and compensation must be made in the steering and breaking control mechanisms to avoid substantial distortion in the proper functioning thereof. Such compensation is provided for this added movement of the axles in the steering and braking connections by making the connection between the wheel and axle supported steering and brake members and the frame supported steering and brake control members at neutral points of motion between the axle and the frame carried members as above set forth. In the form shown, the connections between the axle and wheel supported steering and brake members and the frame supported control members are made at points in substantial alignment with the axes of the spring shackles 10, 11, 49 and 50. By providing the vertical kingpins in the steering wheels, a substantial portion of the road impacts are absorbed on the kingpins without being transmitted to the steering and braking connections, as occurs in the usual types of steering wheel arrangements heretofore proposed. The provision of the vertical kingpins on the wheel centers also prevents the reactions from the front wheel braking arrangements being transmitted to the steering linkages as occurs in the usual arrangements heretofore proposed. It will accordingly be seen that a flexible multiple axle steering unit with brakes on the steering wheels is provided in which compensation is made for the relatively great movement of the axles with relation to the frame, and in which compensation is also made for the road impact and braking reactions which ordinarily are transmitted to the steering arrangement or linkages and increase the difficulty of steering the multiple steering wheels. The improved combination of steering and braking arrangements provides a tandem steering axle control which can easily be handled with balloon or low pressure tires on the four front wheels without the necessity of resorting to power actuated steering apparatus.

The braking compensation on the rear wheels for the relatively great motion of the axles with respect to the wheels is effected in the same manner as the compensation in the front wheel brakes is effected and the braking reactions of the rear or driving wheels are transmitted to the torque tube arrangement as shown in Figure 7 and more fully hereinbefore set forth. The connection of the forward drive axle to the frame is such that the travel or elongation of the propeller shaft 58 is substantially eliminated and the shock present in the prior proposed construction due to oscillating the forward drive axle and the propeller shafts in opposite directions is substantially eliminated. Any swinging movement of the axle results in a minimized extension of the propeller shaft that is substantially equal to the difference between the movements caused by the swinging of the axle about its pivot and the movement due to the swinging of the shaft with respect to the flexible point in the shaft. The connection of the rear drive axle in such manner that both drive axles rotate with the curvature of the paths in the same direction rather than in opposite directions substantially reduces the intermediate shaft travel and an improved multiple or tandem drive axle is provided in which the life and durability is substantially increased over that attained in the prior proposed constructions.

By providing brakes on six of the wheels only the two front wheels will at all times maintain their traction on the road and a highly effective safe braking arrangement is provided. The flexibility of the rear drive arrangement together with the intermediate drive connection and torque tube arrangement within the upper and lower limits of the drive axle housings provides a construction in which a minimum clearance between the frame and the road may be obtained and at the same time a maximum clearance between the frame and the axles is provided. In this way a multiple wheel road vehicle is provided in which the center of gravity of the load and the vehicle body may be substantially lower than has been heretofore attained in the prior proposed constructions.

A further improved feature of the invention is the provision of a road vehicle with tandem steering and tandem drive axles inter-connected with the frame through flexible spring suspension units which permit the wheels to travel over road irregularities with a frame movement substantially less than the actual wheel movement minus the spring deflection, in which the fore and aft movements of the vehicle are eliminated, and in which the independent supporting truck construction for the tandem axles is eliminated.

Figure 9:
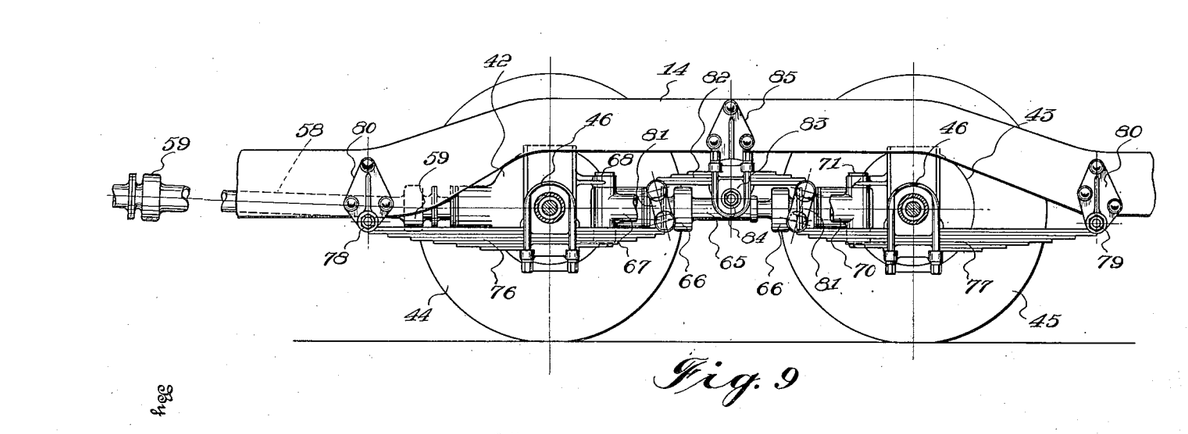
Figures 9 and 10 are side elevations, partially in section, of modified forms of spring suspension and drive arrangements.

The form of invention so far described may be modified by providing compensated spring suspensions for the front and rear tandem axles of the form disclosed in Figure 9. As the application of this form of spring suspension to the steering or front axles will be obvious, it will be described in detail only in connection with the tandem drive axles. The driving axles, torquing, and propeller shaft arrangement and details are the same as above set forth, as indicated by the like characters which have been applied to similar parts, and reference may be had to the description above given for a full understanding of these parts.

Secured to the drive axles 42 and 43 by the journaled spring saddles 46 on opposite sides of the frame are pairs of lower leaf springs 76 and 77 which are secured to the frame 14. The rear ends of the springs 76 and the forward ends of the springs 77 are secured by shackles 81 to the ends of short equalizing springs 82. The equalizing springs 82 have secured to the mid portions thereof saddles 83 which are secured by means of the trunnion pin 84 to the brackets 85. Brackets 85 are secured to the frame 84 at points substantially midway between the brackets 80. It will be noted that the spring supporting saddles 46 are positioned closer to the shackles 81 than to the pins 78 and 79 and the shackles 81 are inclined away from each other under normal load conditions. In this way the distance between the axle centers is reduced to a minimum while at the same time a substantial amount of supporting spring length is interposed between the frame 14 and the driving axles. In operation of this form of the invention the spline travel of the propeller shaft 58 will be substantially the same as that attained in the form above set forth due to location of the oscillating axis for axle 42 towards the front of the vehicle. The spline travel in the intermediate propeller shaft 65 and the movements of the torquing connections will be greater than in the preferred form because the spring deflections and axle oscillations both cause changes in the distance between the axles. The resilience of this type of spring suspension is considerably less than the resilience of the preferred embodiments above set forth, but certain principles of the invention may be applied in a manner that will give reasonably satisfactory operation with proper proportioning of parts.

Figure 10:
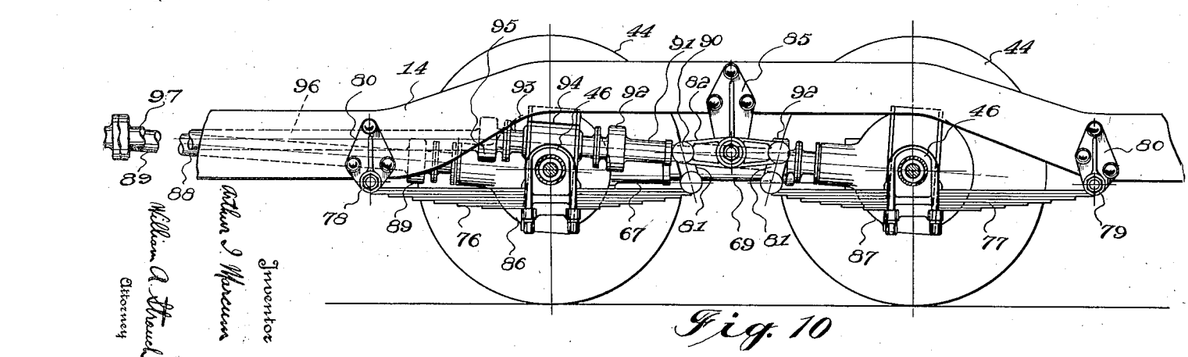

In the form shown in Figure 10 the spring suspension is substantially the same as that set forth in Figure 9 with the exception that the equalizing member 82 is a rigid beam instead of a resilient or spring connection. The driving connection set forth in Figure 10 is however, modified so that differential drive axles 86 and 87 of any standard type may be utilized. The forward drive axle 86 is driven by means of a telescoping or slidably splined propeller shaft 88 provided with flexible or universal drive connections 89 from a frame supported compensating differential driving mechanism of any suitable type (not shown). The rear axle 87 is driven by an intermediate drive shaft 90 provided with the telescoping slidably splined connection 91 and the universal or flexible drive connections 92. The forward universal or flexible coupling 92 is driven from the frame supported compensating or differential mechanism through a universal or flexible connection 97. In operation of this form of the invention the spline shaft travel of the propeller shafts 88 and 96 is minimized due to the oscillation of the axle 86 about an axis intermediate the frame flexible or universal connections 89 and 97. Substantial movement or slippage must however be taken in the intermediate telescope drive connection 91 to provide for the additional movement due to the fact that the oscillation of the axles 86 and 87 are in paths of opposite curvature.

The drive axle arrangement and the driving mechanism set forth in Figure 10 may obviously be applied to vehicles utilizing spring suspensions such as are shown in Figures 1 to 8, and in this form of the invention, the curvatures of the path of movement of the axles 86 and 87 will be in the same direction reducing the splined shaft travel of the intermediate shaft 90 to a minimum.

It is to be understood that the various mechanisms hereinbefore disclosed may be utilized independently of eight wheel road vehicle constructions and that numerous changes may be made in the constructions of the various elements and combinations thereof by those skilled in the art without departing from the spirit of the present invention.

Accordingly, having described preferred embodiments of my invention, what is desired to be secured by Letters Patent and claimed as new is:

1. A vehicle comprising a frame; a pair of tandem axles disposed beneath each end of said frame; steering wheels supporting the forward pair of said axles; driving wheels supporting the rear pair of said axles; spring suspensions interconnecting each of said pairs of axles with said frame on each side thereof, said spring suspensions on each side of the frame being directly secured to the frame at a plurality of spaced points; brakes mounted on said steering and said driving wheels; frame supported steering and brake control members; said steering and brake control members being arranged to swing about axes approximating some of said points so that brake reactions on said steering control member and the effect of the movement of said axles with relation to said frame on said steering and said brake control members is substantially eliminated.

2. A motor vehicle including a frame; a forwardly arranged motor; a rear drive axle; a spring suspension yieldingly connecting said axle to said frame; said spring suspension being pivoted to said frame between said motor and axle so that said axle has a substantial swinging movement about said pivot in excess of the movement permitted by change in shape of the suspension due to spring deflection; an extensible propeller shaft between said motor and axle; said propeller shaft including a flexible joint located between said motor and axle in approximate transverse alinement with said pivot; whereby the swinging movement of the axle causes an extension of the propeller shaft that is minimized and substantially equal to the difference between the movements caused by the swinging of the axle about its pivot and the movement due to the swinging of the shaft with respect to the flexible joint in the shaft.

3. A road vehicle comprising a frame, a pair of axles disposed beneath the forward end of said frame, a pair of springs individual to each axle, each of said springs being connected at one end to said frame equalizing means connected to the frame and to adjacent springs on the same side of the vehicle, whereby said axles are capable of substantial swinging movement independently of the deflection of the springs individual thereto, a pair of dirigible wheels supporting each axle and connected thereto by king pins disposed with their axes lying in the substantially vertical plane that bisects the wheel tread, and frame supported steering means for simultaneously steering said dirigible wheels, and means connecting said frame supported steering means and said wheels, comprising arms pivoted to the frame at points approximating the points of connection between the springs individual to the axles and the frame.

4. A road vehicle as defined in claim 3, including brakes applied to a pair of said dirigible wheels, said brakes being arranged around the king pins, and means for controlling said brakes.

5. A road vehicle comprising a frame, a pair of driven axles arranged adjacent one end of said frame, a pair of wheels supporting each axle, a pair of springs individual to each axle, each pair of springs being pivoted to said frame to swing in substantially parallel arcs about axes that are substantially spaced, means connecting the frame and adjacent springs that are individual to the axles on each side of the frame so that each axle is capable of substantial swinging movement, a flexible propeller shaft for driving said axles, said propeller shaft including a joint that is approximately in alinement with one of said axes, a flexible drive shaft between the axles and an extensible torque resisting connection between said axle, said shafts and connection permitting, without substantial restriction, the relative movement of the axles permitted by their spring connections to the frame.

6. The combination defined in claim 5 including brakes on each of said axles, brake operating means on said frame, and means interconnecting said brake operating means and said brakes, said last named means being connected to said frame at points approximately coincident with the points of connection between the springs individual to the axles and the frame.

7. A road vehicle comprising a frame, a pair of relatively closely disposed tandem axles arranged beneath the forward end of said frame, each of said axles being directly connected to said frame by a pair of springs so that each axle is free to swing with respect to the point of connection of the springs individual thereto and to the frame, means interconnecting the adjacent springs on the same side of the vehicle permitting the movement of each axle relative to the frame and relative to the other axle independently of the deflection of the spring, a pair of steering wheels supporting each axle and connected thereto by king pins disposed so that the axes thereof lie substantially in the plane that bisects the wheel tread, steering mechanism on said frame, steering means on said wheels and arms interconnecting said frame carried steering mechanism and said wheel carried steering means, said arms being connected to the frame at points that are approximately in transverse alinement with the points of connection of the springs individual to the axle, whereby said movement of the axles is substantially unrestricted by the steering connections.

8. A road vehicle as defined in claim 7, together with brakes applied to a pair of said steering means, said brakes being arranged around said king pins so that substantially no unbalanced braking forces tending to disturb the free movement of said axles are introduced thereby.

9. A road vehicle comprising a frame, a pair of axles supporting each end of said frame, the axles of each pair being disposed relatively close together, a pair of springs attached to each axle, each pair of said springs being directly separately attached to said frame adjacent one end of the springs in a manner to permit the axle to swing substantially with respect to said frame independently of spring deflection, means interconnecting the springs of each pair of axles to said frame adjacent each end of the vehicle to distribute the load at that end on the axles disposed adjacent thereto without interfering with said swinging of the axles, a steering mechanism for the wheels on the forward pair of axles, braking mechanism for the wheels on the rearward pair of axles, a forwardly disposed motor, a flexible drive shaft interconnecting said motor and the rearwardly disposed axles, said steering mechanism, braking mechanism and flexible drive shaft being so arranged as to not substantially interfere with the movement of the axles permitted by their spring connections to the frame.

In testimony whereof I affix my signature.

ARTHUR I. MARCUM.